United States Patent [19]

Carlsson et al.

[11] 4,053,947
[45] Oct. 11, 1977

[54] METHOD AND APPARATUS FOR EXECUTING SEQUENTIAL DATA PROCESSING INSTRUCTIONS IN FUNCTION UNITS OF A COMPUTER

[75] Inventors: Karl-Johan Werner Carlsson, Solna; Erik Ivar Sjöqvist, Farsta, both of Sweden

[73] Assignee: Telefonaktiebolaget L M Ericsson, Stockholm, Sweden

[21] Appl. No.: 682,095

[22] Filed: Apr. 30, 1976

[30] Foreign Application Priority Data

May 14, 1975 Sweden .................................. 7505552

[51] Int. Cl.² .............................................. G06F 9/10
[52] U.S. Cl. .................................................. 364/200
[58] Field of Search ...................... 340/172.5; 445/1; 364/900, 200

[56] References Cited

U.S. PATENT DOCUMENTS

| 3,215,987 | 11/1965 | Terzian | 340/172.5 |
| 3,657,705 | 4/1972 | Mekota, Jr. et al. | 340/172.5 |
| 3,689,895 | 9/1972 | Kitamura | 340/172.5 |
| 3,689,895 | 9/1972 | Kitamura | 340/172.5 |
| 3,766,532 | 10/1973 | Liebel, Jr. | 340/172.5 |

*Primary Examiner* — Harvey E. Springborn

*Attorney, Agent, or Firm* — Hane, Sullivan & Spiecens

[57] ABSTRACT

In a computer which includes function units interconnected by a bus system there is a first type of instruction which selects one function unit and orders the performance of an internal function and a second type of instruction which selects two function units for the interchange of data through the bus system and orders the data receiving function unit to perform an internal function using the transferred data. The execution period of the second instruction type has a first part during which the first function unit is ordered to transmit data, a second part during which the data are transferred to the bus system and a third part during which the other function unit receives the transferred data. The design of the bus system makes possible the simultaneous performance of the second and third parts. The instructions are successively obtained by a fixed-cycle reading of an instruction memory and are transferred therefrom through the bus system to the function units. The execution period for an instruction of the first type and for the first part of an execution period part of the second type, respectively, are finished during the read phase of that instruction. The simultaneous performance of the second and third part of an execution period for an instruction of the second type are finished during the read phase of the following instruction.

3 Claims, 3 Drawing Figures

METHOD AND APPARATUS FOR EXECUTING SEQUENTIAL DATA PROCESSING INSTRUCTIONS IN FUNCTION UNITS OF A COMPUTER

The present invention relates to a method and apparatus to execute one of two types of data processing instructions successively obtained by a fixed-cycle reading wherein each instruction is transferred during its read phase from an instruction memory through a common instruction transfer path to a number of function units. The execution period for an instruction of a first type includes the steps of selecting one of the function units and ordering the performance of a function indicated by the instruction of the first type; and an instruction of the second type includes the steps of selecting two of the function units, transferring data between the two selected function units through a data transfer path common to all function units and ordering the function unit which receives data to use such data in the performance of a function indicated by the instruction of the second type. The execution period of instruction of the second type have a first part during which one of the two function units is ordered to transmit data, a second part during which the actual data are transferred from the one function unit to the data transfer path, and a third part during which the second of the two function units receives said actual data.

The dividing up of an execution period into parts is primarily used in a computer having function units of which are mutually interconnected by a common bus system in such a way as described, for instance, in "The Bell System Technical Journal, Vol. 48, Oct. 69, pages 2633 – 2635". One of the function units includes an instruction memory to store instructions comprising binary-coded addresses and orders. The bus system comprises a data transfer bus to which are connected the data storage registers arranged in the function units, and order and address buses which connect the instruction memory to order and address decoders arranged in the function units. Due to such a common bus system the designing of a computer is considerably simplified because a modular structure is obtained having modules which are the function units and comprise uniform interfaces in relation to the bus system.

In older computers an individual connection controlled for example by utilizing a gate for each data transfer so that the execution only consists in opening the respective gate. However, when having the above-described bus system and interfaces, a plurality of logic circuits co-operate when executing an instruction. It is necessary to consider the delays arising due to the access times and the reaction times of the logic circuits as well as due to the transient phenomenon of the bus system. These delays have the disadvantage of causing relatively long execution periods, especially for instructions of the second type. Since the control of the data processing is easiest if equally long execution periods are used for both types of instructions and if a new period is first started when the preceding period is finished, it has hitherto been the practice that the lengths of the periods be determined by the second-type instructions having several execution period parts. Since the instructions of the first type are not divided into parts they require less execution time and consequently, there is superfluous execution time.

The present invention, the characteristics of which appear from the claims, avoids the disadvantages of wasted time due to the fact that it is the less time demanding instructions that determine the timing in which the instructions are sequentially read other from the instruction memory, the longer time being necessary to execute the instructions demanding several phases is obtained by means of an overlapping of the execution periods.

The invention will be described more in detail below with reference to the accompanying drawing wherein.

Figure 1:
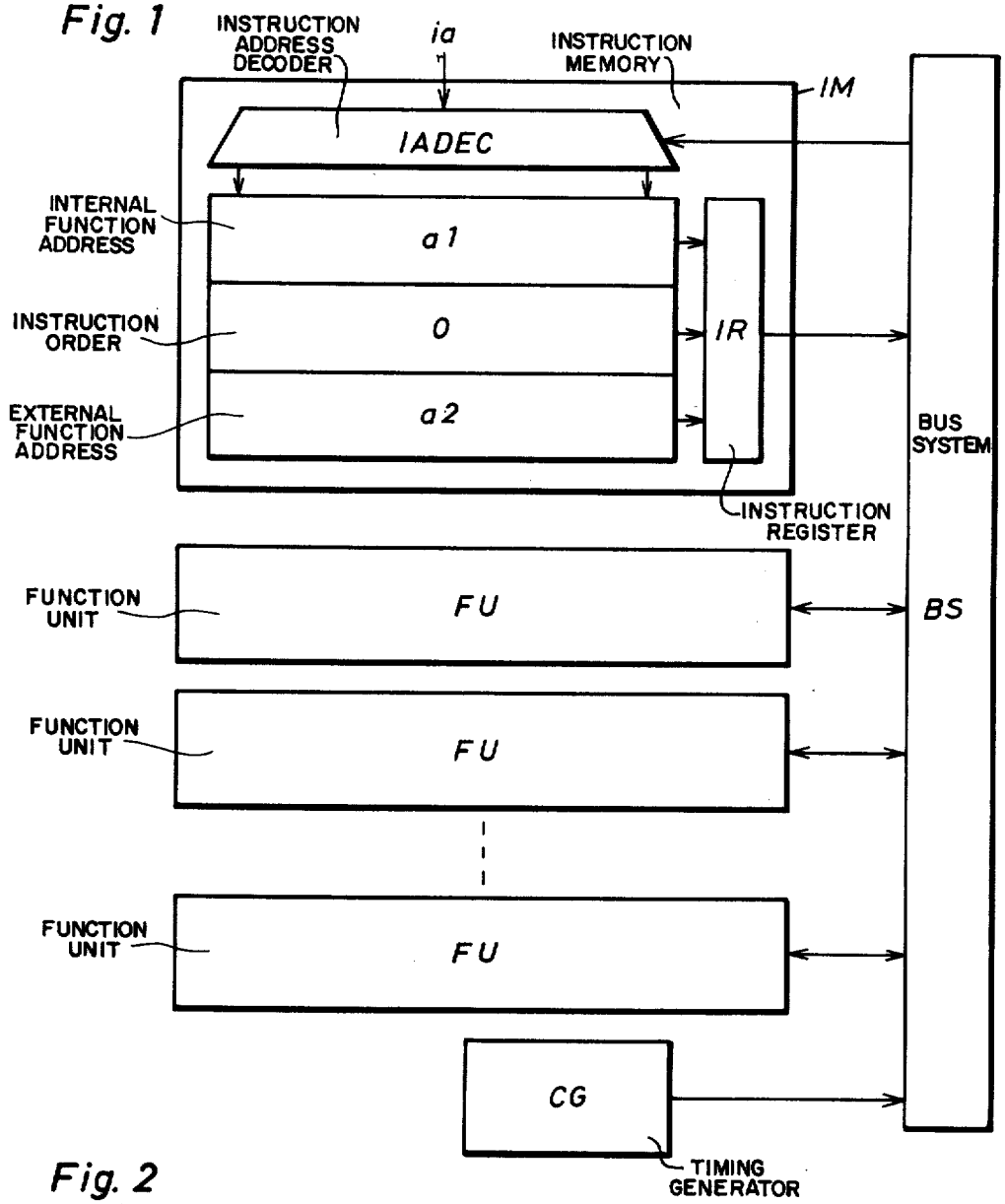
FIG. 1 shows the parts of a computer known, per se, which participate in the execution of instructions.

In accordance with the above mentioned article, FIG. 1 shows a bus system BS to which are connected a timing generator CG, an instruction memory IM and a number of function units FU. The instruction memory stores instructions which are selected in a known way by means of decoded instruction addresses $ia$. The addresses are decoded by a decoder IADEC and the instructions are transmitted to an instruction register IR in a timing determined by means of read phase timing pulses $\phi p$. An instruction comprises a function unit address $a1$ and an order $o$ if the function unit determined by the address $a1$ shall perform an internal function and still another address $a2$ if data shall be transferred from the function unit associated with address $a1$ to the function unit associated with address $a2$.

Figure 2:
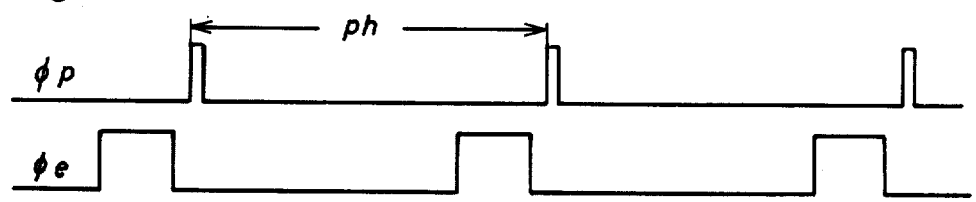
FIG. 2 is a timing diagram which shows phase signals generated by a timing generator; and of which FIG. 3 of which shows an interface to connect a function unit to the bus system of the computer.

FIG. 2 shows by means of a timing diagram that the short phase timing pulses $\phi p$ generated by the timing generator determine phases $ph$ and that phase end signals $\phi e$ also generated by the timing generator indicate the end parts of the phases. The phase end signals are used to protect the function units from the transient phenomenon of the bus system whose logic state changes at the beginning of the phases, for example, due to intruction transmissions to the instruction register. It is assumed that a phase is so long that the state has become stable during respective phase end signal.

Figure 3:
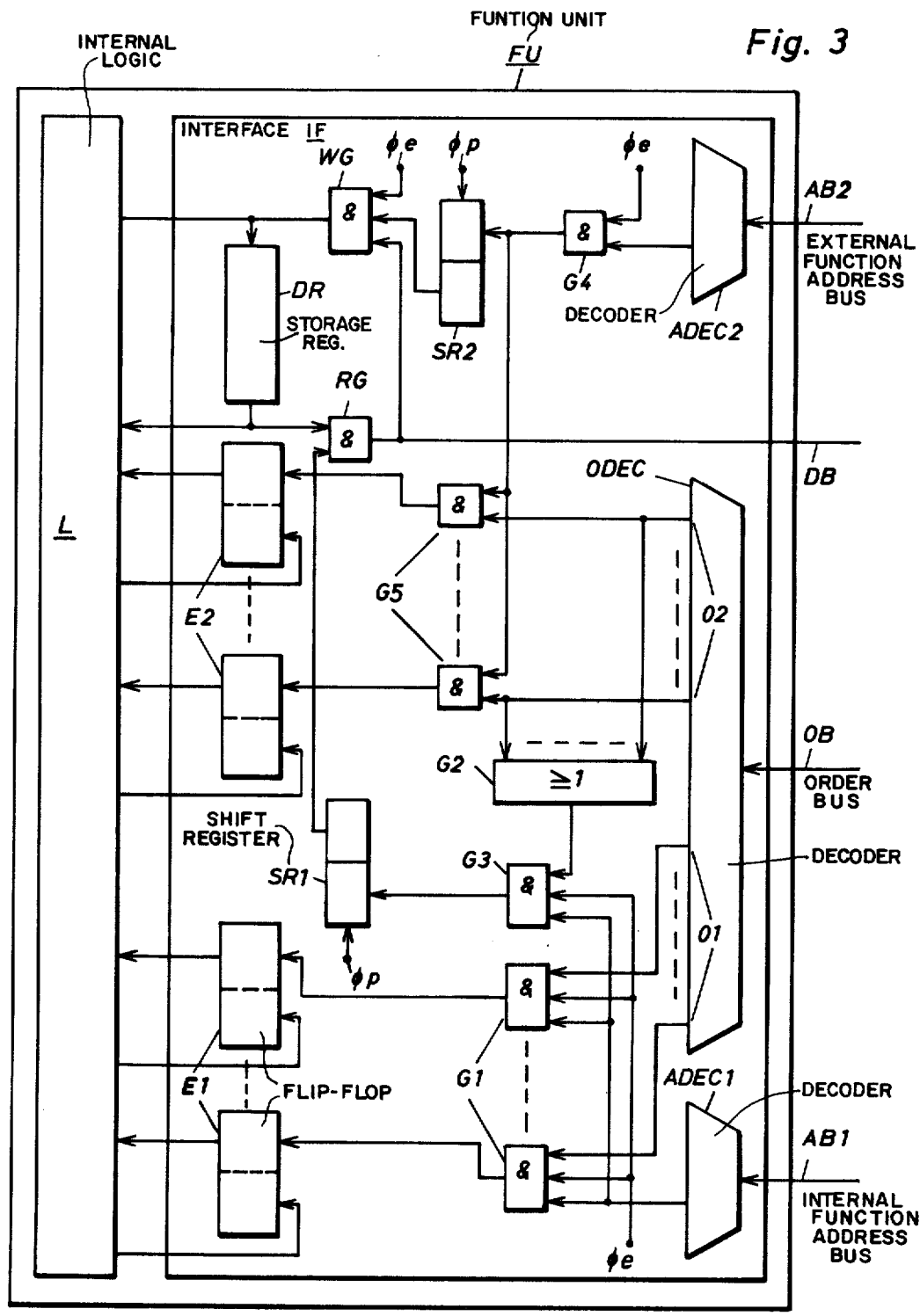

FIG. 3 shows an embodiment of an interface IF of one of the function units FU, which receives the phase signals $\phi p$ and $\phi e$ generated by the timing generator CG. The interface comprises address and order decoders ADEC1, ADEC2 and ODEC which are connected to the address and order buses AB1, AB2 and OB of the bus system in order to receive and decode the addresses and orders $a1$, $a2$ and $o$ which are transferred from the instruction register IM of FIG. 1. Note the outputs O1 of decoder ODEC are associated with instructions of the first type and outputs O2 with instructions of the second type. Furthermore the interface comprises a data storage register DR to transmit data through a read gate RG to a data bus DB and, to receive data through a write gate WG from the data bus DB of the bus system. The data storage register DR constitutes together with a number of first and second logic elements E1 and E2 the logic circuits which are connected to the special internal logic L of the function unit which otherwise in a manner known per se controls the performance of an ordered function. Each of the elements E1 selects an allotted function which does not use the contents of the data storage register, a test or an operating function for example. Each of the elements E2 selects an allotted function which uses data received from said data bus.

For examples of elements used in the embodiment of FIG. 3, see DIGITAL COMPUTER BASICS, Navy TrainingCourse, NAVPERS 10058, U.S. Government Printing Office, 1968 or Digital Equipment Company 1971 catalog.

An instruction of the first type transferred through order bus OB and address bus AB1 activates, after the decoding, the output of one address decoder ADEC1 and the respective outputs O1 of the order decoder ODEC of the addressed function units. In this way an AND-gate G1 alloted to a respective instruction is activated, the output of the AND-gate being connected to the respective element E1. If the address decoder ADEC1 and an output O2 of the order decoder ODEC are simultaneously activated in an interface of a function unit, according to an instruction of said second type, that the function unit will transmit data being stored in its data storage register DR. In order to initiate the ordered data transmission, a first shift register SR1 is activated through an OR-gate G2 and an AND-gate G3. Furthermore, the AND-gates G1 and G3 are controlled by means of the phase end signals φe of the timing generator in order to activate element E1 and shift register SR1 respectively first during the end part of the respective phase. The shift register SR1 which is stepped by means of phase timing pulses φp has its output connected to an input of the read gate RG and is arranged in such a way that the data are transmitted to the data bus during the phase following the read phase during which respective order is read from the instruction memory.

If the address decoder ADEC2 and an output O2 of the order decoder ODEC are simultaneously activated in the interface of a function unit, according to an instruction of the second type, that function unit shall receive and treat the data which according to this instruction are transferred through the data bus DB. Through an AND-gate G4 which is connected to the address decoder ADEC2 and which is controlled by phase end signals φe a shift register SR2 as well as an AND-gate G5 are activated. The output of gate G5 is connected to the element E2 allotted to the respective order. The shift register SR2 which is stepped by means of phase timing pulses φp has its output connected to an input of the write gate WR and is arranged in such a way that the data are received by the data storage register DR during the phase coinciding with the phase for the data transfer according to respective instruction. The write gate WG is provided with an input which receives phase end signals φe in order to insure that only stable logic states are transferred.

In an embodiment not shown on the drawing, the instructions comprise first and second order parts which are transferred and decoded respectively by means of separate first and second order buses, and first and second order decoders respectively. In this case the first address and first order part co-operate in order to activate a first logic element E1 and the first shift register SR1. The second shift registers of the function units are superfluous in this case, if in relation to the first address of the respective instruction its second address and second order part are supplied to the bus system one read phase later, for instance by means of a delay circuit common to the computer.

We claim:

1. In a computer system having means for generating timing pulses which determine sequentially occurring instruction-read phases of equal duration, an instruction memory for storing instructions containing function-unit addresses and function-unit orders, said instruction memory being provided with means for sequentially reading instructions during successive read phases, a plurality of addressed function units for performing functions in accordance with received function-unit orders, said function units including means for receiving and transmitting data, and a bus system for transferring the function-unit addresses and orders from the instruction memory to the function units and for transferring data between the function units, the instructions being of two types, the first type having the steps of selecting by means of the function-unit address part of the instruction one of said function units and to order the performance of a function as determined by a function-unit order part of the instruction, and the second type of instruction including steps of selecting two of said function units by means of two addresses in the function-unit address part of the instruction, to transfer data between the two selected function units through the bus system and to order the function unit which receives data to use the received data in the performance of a function determined by the function-unit order parts of the instruction, the execution period of the second type of instruction being divided into a first part during which one of the two addressed function units is ordered to transmit data, a second part during which actual data are transferred from said one of the function units to the bus system and a third part during which the other of the two function units receives the data from the bus system and performs the required function thereupon.

an improved method for decreasing the operating time for performing a mixed sequence of instructions of the first and second type for said system comprising the steps of performing an instruction of said first type during a said read phase associated therewith and performing an instruction of the second type during two of said read phases wherein the first part of said instruction of the second type is performed during the first read phase associated with said instruction of the second type and the second and third parts of said instruction of the second type are performed during the second of said read phases associated therewith.

2. In a computer having means for generating timing pulses (CG) which determine sequentially occurring instruction-read phases, an instruction memory (IM) for storing instructions containing function-unit addresses and function-unit orders, said instruction memory being provided with means for sequentially reading instructions during successive read phases, a plurality of addressed function units each including a device for processing data for performing functions in accordance with received function-unit orders, said function units including means for receiving and transmitting data and a bus system (AB1, AB2, DB) for transferring the function-unit addresses and orders from the instruction memory to the function units and for transferring data between the function units, the improvement comprising in each function unit at least one data storage means (DR) connected between the associated device for processing data (L) and the bus system (DB) for storing data received from said device before transfer to the bus system or for storing data received from the data bus system before transfer to said device, control means for initiating functions (E1, E2) by said device, a first address decoder means (ADEC1) connected to said bus system (AB1) for emitting a first signal during an instruction-read phase when the bus system is carrying the address of the function unit, a second address decoder means (ADEC2) connected to said bus system (AB2) for emitting a second signal during said instruction-read phase when the bus system is carrying the address of the function unit, an order decoder means (ODEC) for emitting one of a plurality of control signals in accordance with the order present on the bus system, function gating means (G1) connected to said first address decoder means and said order decoder means for energizing said control means to activate said control means to initiate the function specified by the order then present on the bus system in response to said first signal and said one of the plurality of control signals, delayed gating means (G2, G3, SR1 and RG) connected to said order decoder means (ODEC) and said first address decoder means (ADEC1) for permitting the transfer of data from said storage means to said bus system during a first part of a read phase subsequent said read phase wherein said first signal by said first address decoder means was emitted, and second delayed gating means (G4, SR2 and WG) connected to said second address decoder means (ADEC2) for permitting the transfer of said data from the bus system (DB) to said data storage means (DR) during a second part of said subsequent read phase of said second signal by said second address decoder means.

3. The apparatus of claim 2 further comprising means in said timing pulse generating means for generating a timing signal ($\phi e$) at the end of each read phase whereby each of said gating means in each of said function units is caused to operate in response to said timing signal.

* * * * *